Patented Jan. 24, 1939

2,144,943

UNITED STATES PATENT OFFICE 2,144,943

HEAT-ABSORBING GLASS

Donald E. Sharp and William Horak, Hamburg, N. Y., assignors to Bailey & Sharp Co., Hamburg, N. Y.

No Drawing. Application April 29, 1937,
Serial No. 139,769

15 Claims. (Cl. 106—36.1)

This invention relates to heat absorbing glasses, and more particularly to heat resisting, as well as heat absorbing, glasses.

Glasses for absorbing radiant heat, but which are quite transmissive of light are now familiar articles of commerce. All of them depend on the use of ferrous iron in the glass, for bringing about the absorption of heat.

The efficiency of such glasses depends first of all on the relative amounts of light and heat transmitted by the glass, it being desirable to have a glass that transmits as much light as is possible and at the same time absorbs as much heat as is possible. Considerable progress has been made in recent years in improving this efficiency by use of chemical compositions which increase the heat absorption by increasing the extent of reduction of the iron to the ferrous condition, without at the same time introducing additional color, and hence additional light absorption.

When such glasses are used in commercial practice they may become so hot, through absorption of radiant energy, that they are in danger of cracking. As a consequence, in order to make the glass practicable for commercial use, it must be made heat resisting as well as heat absorbing. Otherwise, it is impractical to use a glass of highest heat absorbing efficiency, and some manufacturers meet the situation by making a glass which absorbs less heat, and therefore does not attain such a high temperature in commercial use as to make it likely to break.

The glass may be made heat resisting either by making a glass of low expansion, or by chilling it rapidly to produce a "tempered" or hardened glass, or by both processes at the same time. However, glasses of extremely low expansion are less suitable for the tempering process, so that if both processes were to be used at the same time it is better to utilize a glass composition which does not have an extremely low expansion coefficient, nor yet a very high one.

In the past, in order to lower the expansion coefficient of the glass, compositions of the borosilicate type have always been employed. For example, Rising, in U. S. A. Patents Nos. 1,737,685 and 1,924,752 discloses such compositions, all of which contain substantial amounts of boric oxide, in addition to zinc or cadmium oxides, and a low alkali content. The low alkali content is absolutely necessary in obtaining a low expansion coefficient, and the boric oxide has been considered a necessary adjunct in order to supply a flux to make up for the deficiency of alkali. It is to be noted that all of the claims of Patents Nos. 1,737,685 and 1,924,752 specifically set forth the borosilicate nature of the composition.

Moreover, as is pointed out in Rising Patent No. 1,737,686, in ordinary soda lime glass compositions it is difficult or impossible to obtain the maximum amount of reduction of iron to the ferrous condition by use of ordinary reducing agents such as carbon, without obtaining an unsatisfactory yellow green color, unless zinc or cadmium or tin compounds are employed in the composition. Furthermore, the catalytic effects of zinc, cadmium or tin are greater in the more basic glasses than in the more acid ones. Indeed, a high-alkali-soda-lime glass, of which a glass containing 18% of $Na_2O$ and 8% of CaO and MgO would be typical, can produce a heat absorbing glass in which the ratio of ferrous to ferric iron is much greater than if a lower-alkali-soda-lime glass had been used, the quantity and character of the iron, catalysts and reducing agents being identical in the two cases. The lower-alkali glass referred to might for this comparison be considered as a glass containing about 13% CaO and MgO and 13% $Na_2O$. The high alkali glass referred to, is similar to glasses used for containers and pressed ware, though a little higher in alkali than is customary, and the lower-alkali glass referred to is typical of plate or sheet glass.

We have found that improved heat resistance can be obtained in heat absorbing glasses without the use of a borosilicate type of composition, and that effective reduction of the iron can be obtained in spite of the low alkali content of the glass, if a composition high in lime and alumina is used as a base. Such glasses as are contemplated by the following specification are commercially practicable to melt in spite of the low alkali content and the complete or virtual absence of boric oxide as a flux. This results from the fact that some glasses which contain relatively high amounts of both alumina and lime, will melt and become quite fluid at ordinary glass melting temperatures, because of certain eutectic relations in the alumina-calcia-silica system.

Furthermore, we have found that these melting relations are not unduly disturbed by the presence of substantial amounts of zinc, cadmium, or tin oxides, and that it is also possible to substitute magnesia, barium oxide or strontium oxides for part of the calcium oxide, and still obtain the desired effects.

One glass made in accordance with our invention is known in our records as #3881E, and the batch composition of this glass is set forth in the table, below, the parts being given by weight:

Table

| Samples | 3881E | 3881C | 3898A | 3898B |
|---|---|---|---|---|
| Sand | 100 | 100 | 100 | 100 |
| Aluminum hydrate | 30 | 30 | 30 | 30 |
| Burnt dolomitic lime | 68 | 68 | 68 | 68 |
| Soda ash | 20 | 20 | 20 | 20 |
| Zinc oxide | 10 | 10 | 5 | 5 |
| Cadmium oxide | | | 5 | |
| Tin oxide | | | | 5 |
| Black iron oxide | 3 | 3 | 3 | 3 |
| Aluminum powder | 2 | 2 | 2 | 2 |
| Antimony oxide | | 5 | | |

This glass melts satisfactorily, and when annealed and cooled to room temperature has a blue green color. A similar glass, but in which antimony is substituted for part of the zinc oxide (#3881C in the table) yields an unsatisfactory yellowish green color, and is mentioned here to point out that the easily reducible oxides of antimony and lead are to be avoided in glasses made in accordance with our invention.

Glasses Nos. 3898A and 3898B are compositions to illustrate that cadmium and tin can be substituted wholly or in part for the zinc oxide, to produce a satisfactory product, and are therefore considered to be equivalents in the broader aspects of this invention. Both of these glasses are bluish green in color.

We have tried many other variations in composition, and find that potash or lithium salts may be substituted wholly or in part for the soda, and that considerable variation is possible in the total quantities of lime and alumina as well as in the ratio of these two ingredients. However, in order to obtain a reasonable melting temperature without using too high an alkali content, the sum of the alumina and total oxides of the second group of the periodic table (the so-called RO oxides of the 2nd group, consisting of BeO, MgO, CaO, ZnO, SrO, CdO, and BaO) should be in excess of approximately 25% of the glass composition.

But if the total alumina and RO oxides materially exceeds 50% of the glass composition, the resultant product becomes difficult to work and not easily melted. This range of approximately 25% to 50% of these oxides in the glass therefore is our preferred range under present reasonable manufacturing processes.

The ferrous iron type of heat absorbing glass made in accordance with this invention preferably contains at least approximately 8 and not more than approximately 16 per cent of alumina, at least approximately 18 and not more than approximately 36 per cent of calcia and magnesia, a reducing agent and a low alkali content. The reducing agent is preferably in the range, approximately, between 1 and 10 per cent of the total glass composition, and the alkali content is usually at least approximately 3 per cent and seldom more than approximately 10 per cent of the total glass composition. Throughout the specification and claims the percentages of the constituents of the glass are given as by weight.

It will be noted that the improved heat absorbing, heat resisting glass made according to this invention is characterized by a relatively low alkali content, substantial freedom from boric oxide fluxes, and a total alumina and RO oxides content greater than approximately 25 per cent.

It will be understood that various changes in the materials and proportions which have been herein described in order to explain the nature of the invention, may be made by those skilled in the art within the principle and scope of the invention, as expressed in the appended claims.

We claim:

1. A heat absorbing, silica-calcia-alumina type glass containing ferrous iron and having an alumina content greater than approximately 8 per cent and a calcia content greater than approximately 18 per cent, the balance being mainly silica, RO oxides other than calcia, and an alkaline flux.

2. A heat absorbing, silica-calcia-alumina type glass containing ferrous iron and characterized by an alumina content greater than approximately 8 per cent and a total lime content greater than approximately 18 per cent, the balance being mainly silica, RO oxides other than lime, and one or more alkaline fluxes.

3. A heat absorbing, silica-calcia-alumina type glass containing ferrous iron and characterized by an alumina content in the range between approximately 8 and 16 per cent, a calcia and magnesia content in the range between approximately 18 and 36 per cent, a zinc oxide content in the range between approximately 3 and 15 per cent, and an alkali content in the range between approximately 3 and 10 per cent.

4. A heat absorbing, silica-calcia-alumina type glass containing ferrous iron and having a composition, approximately, of alumina between 8 and 16 per cent inclusive, calcia and magnesia between 18 and 36 per cent inclusive, cadmium oxide between 3 and 15 per cent inclusive, and an alkali content between 3 and 10 per cent inclusive.

5. A heat absorbing, silica-calcia-alumina type glass containing ferrous iron and having an alumina content in the range between 8 and 16 per cent inclusive, and a calcia and magnesia content in the range between 18 and 36 per cent inclusive.

6. A heat absorbing, silica-calcia-alumina type glass containing ferrous iron and having an alumina content in the range between 8 and 16 per cent inclusive, a calcia and magnesia content in the range between 18 and 36 per cent inclusive, a tin oxide content in the range between 1 and 10 per cent inclusive, and an alkali content in the range between 3 and 10 per cent, inclusive.

7. A heat absorbing, silica-calcia-alumina type glass containing ferrous iron and in which the total of alumina and RO oxides is greater than approximately 25 per cent and less than approximately 50 per cent of the composition, the silica content is at least approximately double the alumina content, the zinc oxide does not exceed approximately 50 per cent of the total of alumina and RO oxides, and the alkali content is less than approximately 10 per cent.

8. A heat absorbing glass of the silica-calcia-alumina type and in which the total of alumina and RO oxides is greater than approximately 25 per cent and less than approximately 50 per cent of the composition, the silica content is at least approximately double the alumina content, and containing a metallic oxide reducing agent in an amount not exceeding approximately 50 per cent of the total of alumina and RO oxides, an alkali content in an amount less than approximately 10 per cent, and ferrous iron.

9. A heat absorbing glass of the silica-calcia-alumina type and formed of a batch containing a silica compound, an alumina compound, a calcia compound, one or more alkaline fluxes, an iron compound and a reducing agent, the proportions of the batch ingredients being such that the resulting glass contains, approximately, at least 35 and not more than 65 per cent of silica, at least 8 and not more than 20 per cent of alumina, at least 20 and not more than 40 per cent total RO oxides, not more than 10 per cent alkali, and ferrous iron.

10. A heat absorbing glass of the silica-calcia-alumina type and formed of a batch containing a silica compound, an alumina compound, a calcia compound, one or more alkaline fluxes, an iron compound and a reducing agent, the proportions of the batch ingredients being such that the resulting glass contains, approximately, at least 35 and not more than 65 per cent of silica, at least 8 and not more than 20 per cent of alumina, at least 20 and not more than 40 per cent total RO oxides, not more than 10 per cent of sodium oxide, and the iron compound.

11. A heat resisting, heat absorbing glass of the silica-calcia-alumina type and containing less than approximately 10 per cent alkali, less than approximately 3 per cent $B_2O_3$, greater than approximately 25 per cent total alumina and RO oxides, the balance being mainly silica and colored by reduced iron.

12. A heat resisting, heat absorbing glass of the silica-calcia-alumina type, containing less than approximately 70 per cent silica, less than approximately 10 per cent alkali, more than approximately 8 per cent of alumina, more than approximately 12 per cent of total RO oxides, and ferrous iron.

13. A heat absorbing glass of the silica-calcia-alumina type characterized by an alumina content of at least approximately 8 and not more than approximately 16 per cent, a calcia and magnesia content of at least approximately 18 and not more than approximately 36 per cent, less than approximately 10 per cent alkali, less than approximately 10 per cent of a reducing agent, and ferrous iron.

14. A heat absorbing glass of the silica-calcia-alumina type containing ferrous iron and characterized by a total alumina and RO oxides content of at least approximately 25 per cent, and not more than approximately 50 per cent, of the glass composition, a relatively low alkali content, and a relatively low, oxide reducing content.

15. A heat absorbing glass of the silica-calcia-alumina type containing ferrous iron and characterized by a total alumina and RO oxides content of at least approximately 25 per cent, and not more than approximately 50 per cent, of the glass composition, and by substantial freedom from boric oxide fluxes.

DONALD E. SHARP.
WM. HORAK.